United States Patent
Bowen et al.

(10) Patent No.: US 10,374,694 B1
(45) Date of Patent: *Aug. 6, 2019

(54) METHODS AND SYSTEMS FOR CONTROLLING OPERATION OF SATELLITE DATA UNITS OF AN AIRCRAFT

(71) Applicant: The Boeing Company, Chicago, IL (US)

(72) Inventors: Anngelique A. Bowen, Edmonds, WA (US); Gurjinder S. Rakkar, Lynnwood, WA (US); Ryan D. Mustoe, Brier, WA (US); Glenn A. Torgerson, Snohomish, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/194,717

(22) Filed: Nov. 19, 2018

Related U.S. Application Data (63) Continuation of application No. 16/031,020, filed on Jul. 10, 2018, now Pat. No. 10,164,705.

(51) Int. Cl.
| | |
|---|---|
| *H04W 4/00* | (2018.01) |
| *H04B 7/185* | (2006.01) |
| *H04B 7/155* | (2006.01) |
| *H04W 84/06* | (2009.01) |
| *H04W 84/00* | (2009.01) |

(52) U.S. Cl.
CPC ......... *H04B 7/18521* (2013.01); *H04B 7/155* (2013.01); *H04B 7/18504* (2013.01); *H04W 84/005* (2013.01); *H04W 84/06* (2013.01)

(58) Field of Classification Search
None
See application file for complete search history.

(56) References Cited

U.S. PATENT DOCUMENTS

| | | |
|---|---|---|
| 2005/0215249 A1 | 9/2005 | Little et al. |
| 2017/0054839 A1* | 2/2017 | Ishikawa ........... H04W 52/0274 |

* cited by examiner

*Primary Examiner* — Suhail Khan
(74) *Attorney, Agent, or Firm* — McDonnell Boehnen Hulbert & Berghoff LLP (57) ABSTRACT

In an example, a method for communicating over a satellite network is described. The method includes determining a first availability score for a first satellite data unit (SDU) of an aircraft based on first operational parameters comprising whether the first SDU is (i) reporting valid data, (ii) capable of providing data-link services, and (iii) capable of providing voice services, determining a second availability score for a second SDU of the aircraft based on second operational parameters comprising whether the second SDU is (i) reporting valid data, (ii) capable of providing data-link services, and (iii) capable of providing voice services, comparing the first availability score for the first SDU with the second availability score for the second SDU, and based on comparing the first availability score with the second availability score, controlling one of the first SDU and the second SDU to be an active SDU.

20 Claims, 4 Drawing Sheets

METHODS AND SYSTEMS FOR CONTROLLING OPERATION OF SATELLITE DATA UNITS OF AN AIRCRAFT

CROSS REFERENCE TO RELATED APPLICATION

The present disclosure is a continuation of U.S. patent application Ser. No. 16/031,020, filed on Jul. 10, 2018, the entire contents of which are herein incorporated by reference.

FIELD

The present disclosure relates generally to operation of a satellite communication system of an aircraft, and more particularly, to methods of using operational parameters of satellite data units of an aircraft to control which satellite data unit communicates with a satellite network.

BACKGROUND

A satellite data unit (SDU) is a component of an aircraft's satellite communication system and enables both air-to-ground and ground-to-air communication via a satellite network. In particular, a typical SDU is designed to support data channels for packet data services (also referred to as "data-link" services) and designed to support voice channels for voice services. An SDU designed in this manner can engage in both voice and data communication with at least one satellite of the satellite network. Voice communication, for instance, can involve an audio message sent from a pilot or other individual on the aircraft to an individual at a ground station (e.g., an air traffic controller), or vice versa. Data communication, which can include text messages, location data, speed data, altitude data, and/or other information associated with (or not associated with) the aircraft, can be used in addition to voice communication. In some scenarios, data communication can be used in lieu of voice communication, such as when the aircraft is too far from an air traffic control tower or other ground station.

Existing satellite communication systems include multiple SDUs, where each SDU is configured to engage in communication (e.g., voice, data, or other) with a satellite network. Typically, due to concerns of radio frequency interference between two or more SDUs that are engaging in communications with the satellite network, only one SDU is allowed to be active and transmitting radio frequency signals at a given time. To facilitate this, existing methods involve configuring the SDUs of an aircraft to each have local program logic that enables the SDUs to communicate with each other, to determine when to switch which SDU is active, and to determine which one of the SDUs to make active.

However, these existing methods can negatively impact cost and complexity. For example, SDUs of an aircraft are often provided by different suppliers, and thus, the different SDUs are required to be configured to integrate with each other and with other components of the satellite communication system. This requirement increases the cost of each SDU and of the satellite communication system. Furthermore, configuring each SDU to have the program logic described above increases the complexity of the satellite communication system.

What is needed are systems and methods for controlling which SDU to make active that are efficient, less expensive, and less complex.

SUMMARY

In an example, a method for communicating over a satellite network is described. The method comprises determining a first availability score for a first satellite data unit (SDU) of an aircraft based on first operational parameters comprising whether the first SDU is (i) reporting valid data, (ii) capable of providing data-link services, and (iii) capable of providing voice services, determining a second availability score for a second SDU of the aircraft based on second operational parameters comprising whether the second SDU is (i) reporting valid data, (ii) capable of providing data-link services, and (iii) capable of providing voice services, where the first SDU and the second SDU are each configured to engage in communication with at least one satellite of the satellite network, comparing the first availability score for the first SDU with the second availability score for the second SDU, and based on comparing the first availability score with the second availability score, controlling one of the first SDU and the second SDU to be an active SDU.

In another example, a system for communicating over a satellite network is described. The system comprises a first SDU and a second SDU, each configured to engage in communication with at least one satellite of the satellite network. The system further comprises a network control computing device having a processor and memory storing instructions executable by the processor to perform a set of operations comprising determining a first availability score for the first SDU based on first operational parameters comprising whether the first SDU is (i) reporting valid data, (ii) capable of providing data-link services, and (iii) capable of providing voice services, determining a second availability score for the second SDU based on second operational parameters comprising whether the second SDU is (i) reporting valid data, (ii) capable of providing data-link services, and (iii) capable of providing voice services, comparing the first availability score for the first SDU with the second availability score for the second SDU, and based on comparing the first availability score with the second availability score, controlling one of the first SDU and the second SDU to be an active SDU.

In another example, an aircraft is described comprising a first SDU and a second SDU, each configured to engage in communication with at least one satellite of the satellite network. The aircraft further comprises a network control computing device having a processor and memory storing instructions executable by the processor to perform a set of operations comprising determining a first availability score for the first SDU based on first operational parameters comprising whether the first SDU is (i) reporting valid data, (ii) capable of providing data-link services, and (iii) capable of providing voice services, determining a second availability score for the second SDU based on second operational parameters comprising whether the second SDU is (i) reporting valid data, (ii) capable of providing data-link services, and (iii) capable of providing voice services, comparing the first availability score for the first SDU with the second availability score for the second SDU, and based on comparing the first availability score with the second availability score, controlling one of the first SDU and the second SDU to be an active SDU.

The features, functions, and advantages that have been discussed can be achieved independently in various examples or may be combined in yet other examples.

Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, methods and systems for controlling operation of SDUs of an aircraft are described. More specifically, example methods and systems involve using operational parameters of the SDUs of the aircraft to determine which SDU should be selected for use as an active SDU of the aircraft. In this disclosure, examples will be described primarily with respect to an aircraft containing two SDUs, though it should be understood that, in other examples, an aircraft could include more than two SDUs.

Each SDU of the aircraft is configured to engage in communication with a satellite network (i.e., with at least one satellite of a satellite network). In particular, each SDU is configured to receive and process radio frequency signals from the satellite network, and to transmit radio frequency signals to the satellite network. The radio frequency signals can be representative of voice communications or data communications.

Although each SDU of an aircraft is configured to engage in communication with a satellite network, methods and systems for controlling operation of SDUs of an aircraft involve allowing only the active SDU to transmit radio frequency signals. Example methods and systems monitor various operational parameters of each of the two SDUs and use the monitored parameters as a basis for determining, for each SDU, a respective availability score that represents how suitable the SDU is for being the active SDU. In one example, the system determines, for each SDU, whether the SDU is reporting valid data—namely, whether a data word (or words) that the system receives from the SDU contains bits indicating that the data word(s) is/are valid. If the SDU is reporting valid data, the system increases the availability score for the SDU.

Other operational parameters are employed by the methods and systems in combination with whether an SDU is reporting valid data. In particular, the system determines, for each SDU, whether the SDU is capable of providing data-link services and whether the SDU is capable of providing voice services. While each SDU is generally configured to be able to provide data-link services and voice services (meaning that the SDU is equipped with the proper hardware and software for receiving, processing, and transmitting radio frequency signals representing data and voice communications over a data-link channel and a voice channel, respectively), there are times when an SDU is incapable of providing one or both of such services. For instance, a hardware failure and/or a lack of connectivity with the satellite network can render the SDU incapable of providing data-link services and/or voice services. Hardware failure and/or a lack of network connectivity can cause other problems as well. Thus, hardware health and network connectivity may be other operational parameters employed in some implementations by the methods and systems. There may be other causes as well that contribute to an SDU's inability to provide data-link services and/or voice services.

The methods and systems can involve a network control computing device configured with program logic that enables the network control computing device to use the operational parameters of the SDUs to determine which SDU should be selected for use as the active SDU, thus eliminating a need for each SDU to have local program logic for determining which of the SDUs should be the active SDU, and thereby reducing both the cost of each SDU and the complexity of the manner in which the SDUs are controlled to operate. At a minimum, complexity is reduced in that the SDUs are no longer required to communicate with each other to determine whether to change which SDU is the active SDU and to which SDU to make the change. In addition, examples of the method and systems can improve efficiency of the satellite communication system by continuously monitoring operational parameters of the SDUs so that, at any given time, the most-suitable SDU of the two SDUs can be used as the active SDU.

Implementations of this disclosure provide technological improvements that are particular to computer networks and computing systems, for example, those concerning satellite communications systems and satellite networks.

Computing system-specific technological problems, such as the cost and complexity that accompanies design and integration of different software and/or hardware, as well as inefficiency that can result from such complex design and integration, can be wholly or partially solved by the implementations of this disclosure. For example, implementation of this disclosure reduces the time and cost of designing and integrating software and/or hardware components of an aircraft's satellite communications system, such as, at a minimum, SDUs of an aircraft and computing device(s) configured to control operation of the SDUs. As another example, implementation of this disclosure reduces the complexity of an aircraft's satellite communication system and enables components thereof to more quickly and reliably communicate with each other and with a satellite network.

Implementations of this disclosure can thus introduce new and efficient improvements in the ways in which a controller can control operations of SDUs on an aircraft, and in turn introduce new and efficient improvements in the ways that data and voice communications can be performed between an aircraft and a satellite network.

Figure 1:
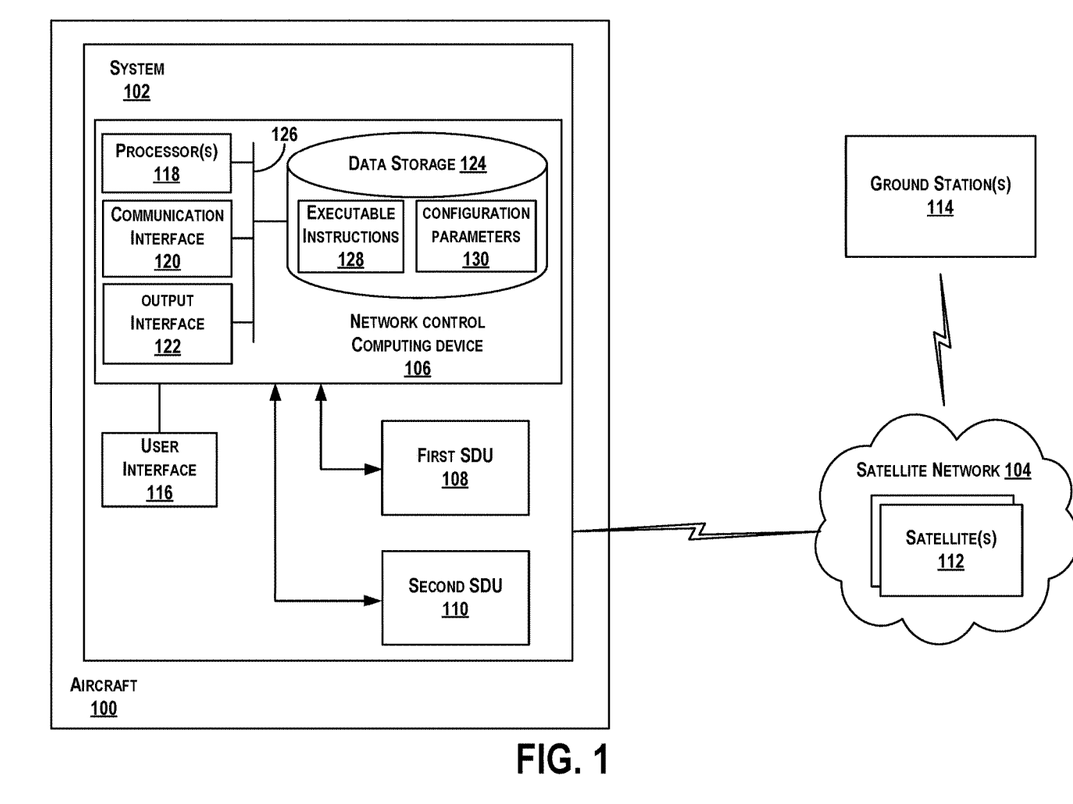
FIG. 1 illustrates a block diagram of an example aircraft, according to an example implementation.

Referring now to the figures, FIG. 1 illustrates a block diagram of an example aircraft 100, according to an example implementation. The aircraft 100 includes a system 102. Specifically, the system 102 is configured for communicating over a satellite network 104, and thus the system 102 is shown to be in communication with the satellite network 104.

The system 102 is shown to include a network control computing device 106. The system 102 is also shown to include a first SDU 108 and a second SDU 110, each of which is communicatively coupled to the network control computing device 106. While the system 102 is illustrated with two SDUs 108 and 110, more than two SDUs may be included. Further, while the two SDUs 108 and 110 are shown to each be independently coupled to the network control computing device 106, the network control computing device 106, the first SDU 108, and the second SDU 110 could all be coupled to the same communication path (e.g., a data bus).

Each of the two SDUs 108 and 110 is configured with hardware and software components, such as a processor, transceiver, and program logic, that enables the SDU to engage in radio frequency communication (e.g., voice and/or data communication) with at least one satellite 112 of the satellite network 104, and thus engage in such communication with one or more ground stations 114 and/or with other devices (not shown) via the satellite network 104. As so configured, each of the two SDUs 108 and 110 can provide data-link services and/or voice services when the SDU is within coverage of the satellite network 104 (provided no other issue, such as hardware or software issues, is preventing the SDU from providing one or more of such services). Within examples, each SDU can be configured to transmit, to the network control computing device 106, at one or more points in time, indications of the SDU's operational parameters. Each SDU can be configured to transmit indications of its operational parameters in response to receiving a request from the network control computing device 106 and/or automatically at one or more predefined times, such as at a predefined frequency (e.g., every thirty seconds).

The network control computing device 106 is responsible for controlling operation of the first SDU 108 and the second SDU 110, particularly by controlling which of the two SDUs 108 and 110 to be the active SDU. As noted above, the network control computing device 106 allows only the active SDU to transmit radio frequency signals to the satellite network 104. Within examples, the SDU of the two SDUs 108 and 110 that is not currently the active SDU may be referred to as the "standby SDU" or the "warm-standby SDU." The network control computing device 106 can configure the standby SDU to not transmit radio frequency signals to the satellite network 104. To facilitate this, for example, the standby SDU can be powered on, but not logged into the satellite network 104. However, the standby SDU can in some scenarios maintain a particular level of communications with the network control computing device 106 and other components of the aircraft 100 with which the standby SDU interfaces, so as to ensure that such components do not declare the standby SDU to be nonfunctioning. For instance, the standby SDU can engage in periodic heartbeat communications with interfacing components, where the standby SDU transmits data indicating to such components that the standby SDU is powered on. In addition, the standby SDU can be configured to transmit, to the network control computing device 106, data indicating one or more operational parameters of the standby SDU, so that the network control computing device 106 can use the data as a basis for determining whether the standby SDU should be made the active SDU.

The system 102 is also shown to include a user interface 116, which can include any one or more devices through which the network control computing device 106 can receive input from a user (e.g., a pilot of the aircraft 100) and/or provide an output to the user. For instance, the user interface 116 can include a display device (e.g., a touch screen or computer monitor), a keyboard, and/or a mouse, among other possibilities. Through the user interface 116, a user can control operation of the two SDUs 108 and 110. For example, the user can provide input data representing a selection of either the automatic mode or the manual mode. Further, in the manual mode, the user can provide input data representing a selection of one of the two SDUs 108 and 110 to control to be the active SDU. Within examples, the user interface 116 can take the form of a tuning and control panel (TCP) through which a pilot or other individual on the aircraft 100 can select the manual mode or the automatic mode. Other examples are possible as well.

The network control computing device 106 is shown to include one or more processors 118, a communication interface 120, an output interface 122, and data storage 124, each connected to a communication bus 126. The network control computing device 106 may also include hardware to enable communication within the network control computing device and between the network control computing device and other devices (not shown). The hardware may include transmitters, receivers, and antennas, for example.

The communication interface 120 may be a wireless interface and/or one or more wireline interfaces that allow for both short-range communication and long-range communication to one or more networks or to one or more remote devices. Such wireless interfaces may provide for communication under one or more wireless communication protocols, Bluetooth, WiFi (e.g., an institute of electrical and electronic engineers (IEEE) 802.11 protocol), Long-Term Evolution (LTE), cellular communications, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. Thus, the communication interface 120 may be configured to receive input data from one or more devices, and may also be configured to send output data to other devices.

The output interface 122 outputs information, such as outputting information from the network control computing device 106 to the two SDUs 108 and 110 (e.g., commands that control operation of the two SDUs 108 and 110). The output interface 122 can also output information to the user interface 116, such as an indication of which of the two SDUs 108 and 110 is the active SDU, or perhaps fault information associated with either of the two SDUs 108 and 110. The output interface 122 may thus be similar to the communication interface 120 and can be a wireless interface (e.g., transmitter) or a wired interface as well.

The data storage 124 may include or take the form of memory, such as one or more computer-readable storage media that can be read or accessed by the processor(s) 118. The computer-readable storage media can include volatile and/or non-volatile storage components, such as optical, magnetic, organic or other memory or disc storage, which can be integrated in whole or in part with the one or more processors 118. The data storage 124 is considered non-transitory computer readable media. In some examples, the data storage 124 can be implemented using a single physical device (e.g., one optical, magnetic, organic or other memory or disc storage unit), while in other examples, the data storage 124 can be implemented using two or more physical devices.

The data storage 124 thus is a non-transitory computer readable storage medium, and executable instructions 128 are stored thereon. The executable instructions 128 include computer executable code. In addition, the data storage 124 also stores configuration parameters 130. The configuration parameters 130 can include various parameters according to which the network control computing device 106 performs functions described herein.

Within examples, the configuration parameters 130 can include one or more data words. Each data word is made up of a sequence of bits, and one or more subsets (or "fields") of bits within the data word can be dedicated to defining a particular configuration parameter. For example, one such data word can contain a sequence of 32 bits (bit 1 through bit 32). In this data word, (i) bit 1 indicates how many SDUs are installed in the aircraft 100 and has a default value of 1 which indicates that two SDUs are installed, (ii) bit 2 indicates which of the two SDUs is a preferred active SDU (e.g., which SDU is preferred by the customer), where a value of 0 indicates that the first SDU 108 is preferred and a value of 1 indicates that the second SDU 110 is preferred, and (iii) bits 3 through 32 are padding bits (e.g., 30 bits where each bit has a value of 0). As another example, another such data word can contain 32 bits, divided into four fields with 8 bits each (e.g., bits 1-8, 9-16, 17-24, and 25-32), where each field defines a respective timer according to which certain functions described herein can be performed. Other examples are possible as well.

The processor(s) 118 may be general-purpose processors or special purpose processors (e.g., digital signal processors, application specific integrated circuits, etc.). The processor(s) 118 may receive inputs from the communication interface 120 as well as from other sensors or the user interface 116, and process the inputs to generate outputs that are stored in the data storage 124 and used to control operation of the two SDUs 108 and 110. The processor(s) 118 can be configured to execute the executable instructions 128 (e.g., computer-readable program instructions) that are stored in the data storage 124 and are executable to provide the functionality of the network control computing device 106 described herein. For example, the executable instructions 128 can define a software application that, when executed, causes the network control computing device 106 to perform one or more of the functions described herein.

Within one example, in operation, when the executable instructions 128 are executed by the processor(s) 118 of the network control computing device 106, the processor(s) 118 are caused to perform a set of operations including to determine a first availability score for the first SDU based on first operational parameters comprising whether the first SDU is (i) reporting valid data, (ii) capable of providing data-link services, and (iii) capable of providing voice services, determine a second availability score for the second SDU based on second operational parameters comprising whether the second SDU is (i) reporting valid data, (ii) capable of providing data-link services, and (iii) capable of providing voice services, compare the first availability score for the first SDU with the second availability score for the second SDU, and based on comparing the first availability score with the second availability score, control one of the first SDU and the second SDU to be an active SDU.

Within another example, the set of operations described above can be a first set of operations, and when the executable instructions 128 are executed by the processor(s) 118 of the network control computing device 106, the processor(s) 118 are caused to perform a second set of operations including to receive first input data representing a selection of one of two mutually-exclusive operational modes, and in response to receiving the first input data, control the network control computing device to operate in accordance with the selection. The two mutually-exclusive operational modes include an automatic mode and a manual mode. Operation in the automatic mode includes iteratively performing the first set of operations, and operation in the manual mode includes performing a third set of operations including to receive second input data representing a selection of one of the first SDU and the second SDU to be the active SDU, and in response to receiving the second input data, control one of the first SDU and the second SDU to be the active SDU in accordance with the selection. When operating in the manual mode, the executable instructions 128 can be executed by the processor(s) 118 of the network control computing device 106 to cause the processor(s) 118 to perform the third set of operations.

More detailed example operations will now be described. While some operations are described as being performed in a particular order, it should be understood that such operations could be performed in different orders.

Further, in the event that the network control computing device 106 detects an error with one or more of its components and/or with one or more of the two SDUs 108 and 110 during performance of any one or more of the operations described herein, the network control computing device 106 can generate and output a fault report indicating a source of the error and perhaps additional details regarding the error. For example, if the network control computing device 106 detects a hardware failure of the first SDU 108, the network control computing device 106 can provide for display on the user interface 116 an indication of the hardware failure. Other examples are possible as well.

Within examples described herein, when the network control computing device 106 is initialized (i.e., turned on, booted up, loads a software application for controlling SDU operation, or otherwise begins operating), the network control computing device 106 can refer to the configuration parameters 130 (e.g., to one or more bits in a data word) as a basis for determining which of the two SDUs 108 and 110 is a preferred active SDU and/or as a basis for determining one or more other parameters according to which to carry out SDU operations.

After initialization, the network control computing device 106 can determine whether the network control computing device 106 has received, from the user interface 116 (e.g., from the TCP), input data representing a selection of either the manual mode or the automatic mode. Within examples, if the network control computing device 106 determines from the input data that the manual mode has been selected, the network control computing device 106 can then receive additional input data representing a selection of one of the two SDUs 108 and 110 to be the active SDU. Alternatively, instead of receiving two inputs from the user interface 116, the network control computing device 106 may receive, from the user interface 116, input data representing a selection of one of the two SDUs 108 and 110, and receipt of the input data can trigger the network control computing device 106 to operate in the manual mode.

If the network control computing device 106 receives, at any point after initialization, input data representing a selection of the automatic mode, the network control computing device 106 can iteratively perform a particular set of operations corresponding to the automatic mode. The network control computing device 106 can perform the set of operations until one or more conditions are met, such as if the network control computing device 106 receives input data representing a selection of the manual mode and/or if the network control computing device 106 detects an error with the automatic mode.

Operation in the automatic mode will now be described. As noted above, when operating in the automatic mode, the network control computing device 106 determines an availability score for each of the two SDUs 108 and 110, compares the two availability scores, and then, based on the comparison, controls one of the two SDUs 108 and 110 to be the active SDU.

Within examples, when the one of the two SDUs 108 and 110 to be made the active SDU is not already the active SDU, the act of controlling the one of the two SDUs 108 and 110 to be the active SDU can involve the network control computing device 106 sending a command signal to the one of the two SDUs 108 and 110, which can trigger the one of the two SDUs 108 and 110 to begin operating as the active SDU. For instance, receipt and acknowledgement of the command signal can trigger the SDU to perform actions to engage in, or prepare to engage in, data, voice, or other communications with the satellite network 104, or to perform other types of actions. Within examples, actions can involve one or more of the following: powering on (if the SDU is not already powered on), establishing a connection with the satellite network 104 (if the SDU is not already connected with the satellite network 104), transmitting and/or receiving data communications over the satellite network 104 while providing data-link services, and transmitting and/or receiving voice communications over the satellite network 104 while providing voice services, among other possible actions.

Further, when the one of the two SDUs 108 and 110 to be made the active SDU is not already the active SDU, the act of controlling the one of the two SDUs 108 and 110 to be the active SDU can also involve the network control computing device 106 sending a command signal to the other of the two SDUs 108 and 110 to cause the other SDU to deactivate, power down, terminate receipt and/or transmission of data, voice, or other communications (either immediately or after a predefined time elapses), or otherwise stop functioning as the active SDU. The other SDU can then set itself to operate in a mode in which it is powered down, or powered on but not connected to the satellite network 104, is transmitting data (e.g., data words) to the network control computing device 106, but is not transmitting communications to the satellite network 104.

Within examples, when the one of the two SDUs 108 and 110 to be made the active SDU is already the active SDU, the act of controlling the one of the two SDUs 108 and 110 to be the active SDU can involve the network control computing device 106 sending a command signal to the one of the two SDUs 108 and 110 to cause the one of the two SDUs 108 and 110 to continue operating as the active SDU.

Alternatively, the network control computing device 106 can take no action, and thus the active SDU will continue to operate as the active SDU until controlled by the network control computing device 106 to do otherwise.

Within examples, the network control computing device 106 will determine the active SDU to be the SDU of the two SDUs 108 and 110 that has a higher availability score than the other SDU of the two SDUs 108 and 110. An availability score can be represented in a quantitative or qualitative form that falls along a spectrum ranging from an indication of a lowest possible score to a highest possible score. For example, an availability score can take the form of a number, such as an integer value (e.g., 0, 1, 2, 3, etc.) or a percentage (e.g., 10%, 50%, etc.), and/or can take the form of text such as "low," "medium," and "high." Other examples are possible as well.

In a scenario where neither of the two SDUs 108 and 110 is the active SDU yet (e.g., the first time after initialization that the network control computing device 106 determines which SDU should be the active SDU) and one of the two SDUs 108 and 110 is specified in the configuration parameters 130 as a preferred active SDU, operation in the automatic mode serves as a way to determine whether the current service capabilities of the preferred active SDU, as represented by the availability score of the preferred active SDU, is more desirable than the expected service capabilities of the other SDU (e.g., the standby SDU), as represented by the availability score of the other SDU. If so, the network control computing device 106 will operate the preferred active SDU as the active SDU. If not, the network control computing device 106 will operate the other SDU as the active SDU. Similarly, in scenarios where one of the two SDUs 108 and 110 is already the active SDU, operation in the automatic mode serves as a way to determine whether the current service capabilities of the active SDU, as represented by the availability score of the active SDU, is more desirable than the expected service capabilities of the other SDU, as represented by the availability score of the other SDU. If so, the network control computing device 106 will continue to operate the current active SDU as the active SDU. If not, the network control computing device 106 will operate the other SDU as the active SDU.

In a scenario where one of the two SDUs 108 and 110 is currently the active SDU and the two SDUs 108 and 110 have the same availability score, the network control computing device 106 will maintain the current active SDU as the active SDU. In a scenario where neither of the two SDUs 108 and 110 is the active SDU yet and the two SDUs 108 and 110 have the same availability score, the network control computing device 106 will refer to the configuration parameters 130 and select the preferred active SDU to be the active SDU.

An availability score for an SDU is determined based on a minimum of three operational parameters. One such operational parameter is whether the SDU is reporting valid data, where "data," in this context, refers not to data communications that are part of data-link services, but rather to data words that typically contain indications of operational parameters, or other forms of data transmitted between the SDU and the network control computing device 106 to facilitate operations within the aircraft's 100 avionics local area network. More specifically, the operational parameter of whether the SDU is reporting valid data indicates whether data provided by the SDU is valid for use in supporting aircraft operations. The other two of the three operational parameters include whether the SDU is capable of providing data-link services and whether the SDU is capable of providing voice services.

When the network control computing device 106 determines that the network control computing device 106 is not receiving any data from the SDU (i.e., data words that typically contain indications of operational parameters, or other forms of data transmitted between the SDU and the network control computing device 106 to facilitate operations within the aircraft's 100 avionics local area network), the network control computing device 106 will determine the availability score for the SDU to be 0. Within examples, the act of determining that the network control computing device 106 is not receiving any data from the SDU can involve the network control computing device 106 determining that a particular time period has elapsed since the last time the network control computing device 106 received data from the SDU (e.g., no data has been received within the last 10 minutes).

Each of the three operational parameters noted above, as well as other operational parameters discussed herein, can be indicated in data words received by the network control computing device 106 from the SDU in accordance with a particular data protocol. Within examples, data words that indicate SDU operational parameters may have a format defined by a particular communication protocol for communications within an aircraft's local area network, such as the ARINC 429 protocol. Per the ARINC 429 protocol or another type of protocol, each data word can include one or more fields, where each field includes one or more bits indicating a particular operational parameter. Further, one of the fields may be a field that serves as a label for the data word. Each label may be distinct and may identify the type of information provided in a data word.

An example data word (or multiple words) may include one or more bits that indicate to the network control computing device 106 whether the SDU from which the network control computing device 106 received the data word is reporting valid data. Another example data word (or multiple words) may include one or more bits that indicate to the network control computing device 106 whether the SDU is capable of providing data-link services. And another example data word (or multiple words) may include one or more bits that indicate to the network control computing device 106 whether the SDU is capable of providing voice services. While separate, distinct data words can may indicate separate, distinct operational parameters in some scenarios, in other scenarios one data word can indicate multiple operational parameters. For instance, one data word can include (i) one or more bits that indicate to the network control computing device 106 whether the SDU is capable of providing voice services and (ii) one or more bits that indicate to the network control computing device 106 whether the SDU is capable of providing data-link services.

Within examples described herein, the network control computing device 106 can also take into account operational parameters that relate an SDU being within coverage of the satellite network 104 and operational parameters that relate to hardware capabilities of an SDU. Whether the network control computing device 106 takes either of these operational parameters into account can depend on whether the SDU is already the active SDU (or, if no SDU is currently the active SDU, whether the SDU is the preferred active SDU specified by the configuration parameters 130).

For example, consider a scenario in which the first SDU 108 is currently the active SDU or is specified in the configuration parameters 130 as the preferred active SDU. In this scenario, when determining the availability score for the first SDU 108, the network control computing device 106 can take into account whether the first SDU 108 is within a coverage area of the satellite network 104 (i.e., whether the first SDU 108 is within coverage of the satellite network 104 and thus able to engage in communications with the satellite network 104). Within examples, the act of taking into account whether the first SDU 108 is within a coverage area of the satellite network 104 may involve taking into account whether the first SDU 108 is expected to be within a coverage area of the satellite network 104 at some point in the future, such as within a predetermined period of time (e.g., within the next five minutes). To facilitate this, each SDU can be configured with locally-stored satellite beam maps and other logic to determine whether the SDU is within network coverage and/or is expected to be within network coverage and then provide a corresponding indication in a data word (or multiple words) transmitted to the network control computing device 106. In particular, the data word(s) may include one or more bits that indicate to the network control computing device 106 whether the first SDU 108 is within network coverage and/or is expected to be within network coverage. As a more particular example, a data word may include one bit that indicates whether the first SDU 108 is within network coverage and/or is expected to be within network coverage (e.g., 0 if not within network coverage and/or not expected to be within network coverage, 1 if within network coverage and/or expected to be within network coverage). Within additional examples, the act of taking into account whether the first SDU 108 is within a coverage area of the satellite network 104 may also involve taking into account whether the first SDU 108 has an established network connection with the satellite network 104.

The network control computing device 106 can be configured to take certain precautionary actions to prevent an availability score from dropping due to a temporary loss of network coverage. For example, the configuration parameters 130 can specify a predetermined timer value that defines how long the network control computing device 106 should wait before treating a loss of network coverage as a condition that lowers an SDU's availability score. As a more particular example, if the network control computing device 106 determines that the first SDU 108 has not been within network coverage for a predetermined timer value of at least three minutes, the network control computing device 106 will then lower the first SDU's 108 availability score. Thus, the network control computing device 106 will not treat a loss of network coverage lasting less than three minutes as a loss of network coverage that affects the first SDU's availability score.

Furthermore, in the scenario described above, when determining the availability score for the second SDU 110, the network control computing device 106 can take into account whether the second SDU 110 is experiencing hardware failure. To facilitate this, a data word (or multiple words) may include one or more bits that indicate to the network control computing device 106 whether the second SDU 108 is experiencing a hardware failure. For example, the data word may include (i) one or more bits that indicate to the network control computing device 106 that a first hardware component of the second SDU 108 is experiencing a hardware failure (e.g., a defective power supply or input/output port) and (ii) one or more bits that indicate to the network control computing device 106 that a second, different hardware component of the second SDU 108 is experiencing a hardware failure (e.g., a missing or broken subscriber identity module (SIM) card). As another example, the data word may include one bit that serves as a global health indicator for the second SDU 108 and indicates to the network control computing device 106 whether the second SDU 108 is experiencing any sort of hardware failure. Further, in some scenarios, corrupted software detected by the second SDU 108 may be reported by the second SDU 108 to the network control computing device 106 as a hardware failure.

Within examples, considering again the scenario described above, the network control computing device 106 can determine the availability score of the first SDU 108 according to Table 1 below.

| Availability Score | Condition |
| --- | --- |
| 0 | The first SDU 108 is not reporting valid data, is not reporting any data, or is not expected to be within network coverage |
| 1 | The first SDU 108 is reporting valid data and is within network coverage, but is unable to provide data-link and voice services |
| 2 | The first SDU 108 is reporting valid data and is within network coverage, but is only capable of providing data-link services |
| 3 | The first SDU 108 is reporting valid data and is within network coverage, but is only capable of providing voice services |
| 4 | The first SDU 108 is reporting valid data, is within network coverage, and is capable of providing both data-link and voice services |

Further, the network control computing device 106 can determine the availability score of the second SDU 110 according to Table 2 below. Other examples for determining the availability scores of the two SDUs 108 and 110 are possible as well.

| Availability Score | Condition |
| --- | --- |
| 0 | The second SDU 110 is not reporting valid data or is not reporting any data |
| 1 | The second 110 SDU is reporting valid data, but has hardware failure preventing it from providing data-link and voice services |
| 2 | The second SDU 110 is reporting valid data and is within network coverage, but is only capable of providing data-link services |
| 3 | The second SDU 110 is reporting valid data and is within network coverage, but is only capable of providing voice services |
| 4 | The second SDU 110 is reporting valid data, is within network coverage, and is capable of providing both data-link and voice services |

Upon determining the two availability scores, the network control computing device 106 can compare the two scores and then control the SDU having the higher availability score to be the active SDU (or, in the event that the scores are the same, control the current active SDU or preferred active SDU to be the active SDU, as discussed above).

In any event, the act of controlling an SDU to be the active SDU can involve transmitting a command to the SDU to be the active SDU and then waiting for a response from the SDU that confirms that the SDU has been made the active SDU. Within examples, the network control computing device 106 can be configured to wait a first predetermined period of time from the transmitting of the command. The first predetermined period of time, which gives the SDU time to accept the command and report itself active, can be defined in the configuration parameters 130 and, as an example, can have a value in a range between 15 and 90 seconds, such as 30 seconds. As a more particular example, the network control computing device 106 may wait 30 seconds. Other periods of time are possible as well.

If a response is not received from the SDU within the first predetermined period of time, the network control computing device 106 will control the other SDU to be the active SDU. Whereas, if a response is received from the SDU within the first predetermined period of time, the network control computing device 106 will maintain the SDU as the active SDU for a second predetermined period of time. The second predetermined period of time can be defined in the configuration parameters 130 and, as an example, can have a value in a range between 10 and 20 minutes. As a more particular example, the SDU may be maintained as the active SDU for 19 minutes before the network control computing device 106 enables it to be switched to the other SDU. Other periods of time are possible as well. The second predetermined period of time acts as a safeguard to ensure that, once an SDU is made the active SDU, the SDU then has enough time to log onto the satellite network 104 and begin providing services before a switch to a different SDU could occur. The second predetermined period of time also acts to ensure that an excessive amount of switching between SDUs does not occur within a short span of time.

In some scenarios, although the network control computing device 106 may determine that the active SDU should be switched from the first SDU 108 to the second SDU 110 (or vice versa), the active SDU may be engaged in a voice call. Thus, switching while the active SDU is engaged in the voice call may be undesirable, as it may abruptly end the voice call. Accordingly, within examples described herein, the network control computing device 106 can be configured such that the network control computing device 106 can determine that the active SDU is engaged in providing an ongoing voice call over the satellite network 104 and, while the active SDU is engaged in providing the ongoing voice call, the network control computing device 106 will prevent commands from being sent to the other SDU to cause the other SDU to be the active SDU. In other words, the network control computing device 106 will maintain the active SDU as the active SDU until the voice call has completed. Within examples, the configuration parameters 130 may define a third predetermined period of time that is the maximum amount of time from a placement of the voice call that the network control computing device 106 will allow the voice call to continue before issuing a command that switches the active SDU to a different SDU and thus ending the voice call. The third predetermined period of time can have a value in a range between 2 minutes and 10 minutes, such as 5 minutes. Other examples are possible as well.

Figure 2:
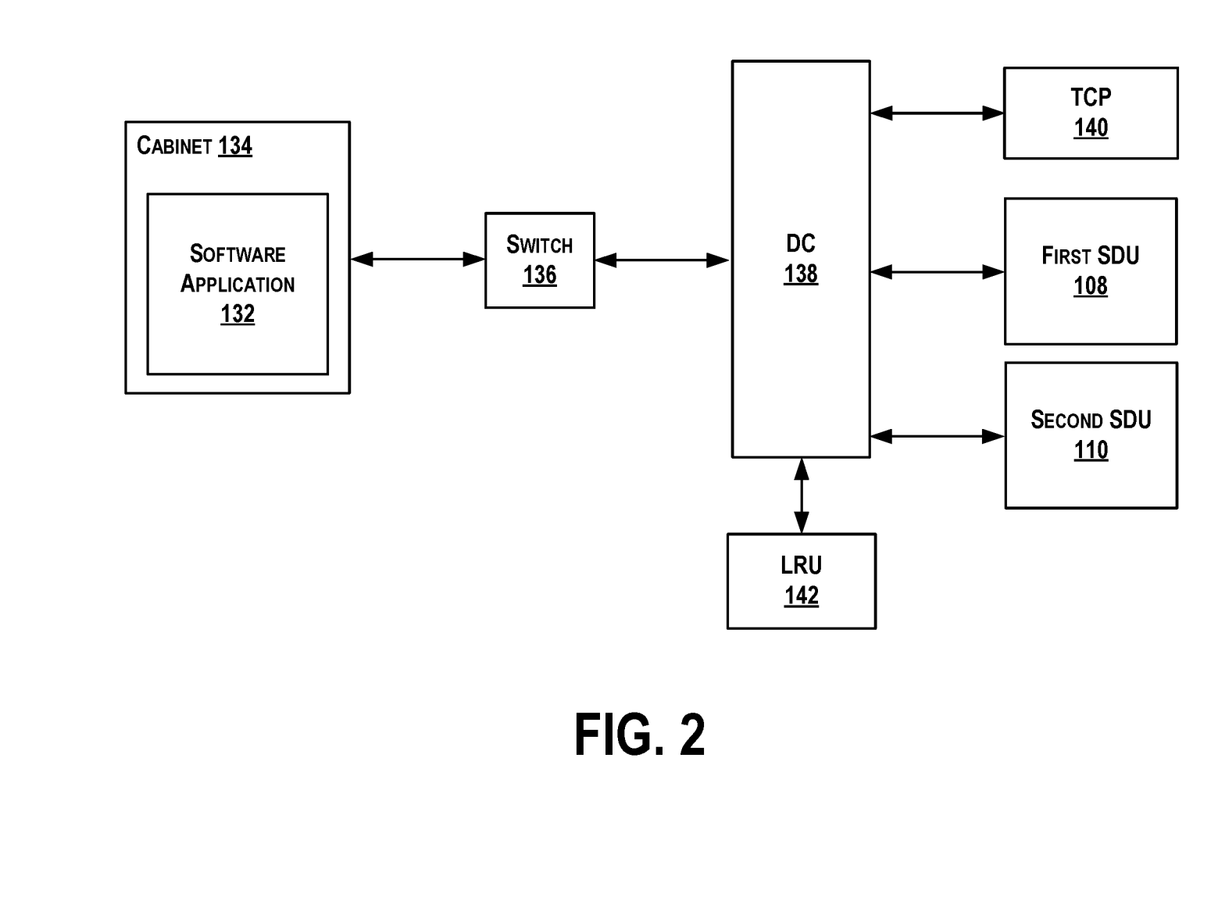
FIG. 2 illustrates a block diagram of example components within the aircraft of FIG. 1, according to an example implementation.

FIG. 2 illustrates a block diagram of example components within the aircraft 100, according to an example implementation. More specifically, FIG. 2 illustrates in more detail how a software application 132 configured to control operations of the first SDU 108 and the second SDU 110 interfaces with other components in the aircraft 100. While one or more of the components illustrated in FIG. 2 are configured for use in facilitating communication over the satellite network 104, one or more of the components may additionally or alternatively be configured for other uses on the aircraft as well, such as flight control, logistics planning, and/or other purposes.

Cabinet 134 is a computing system configured to host processing modules, power control modules, input/output modules, network switches, and/or other computing resources. Software application 132 can be installed on, and can be executed by, cabinet 134. With software application 132 installed on and executable by cabinet 134, cabinet 134 can serve as network control computing device 106 or can host network control computing device 106 along with other computing devices/modules. Although one cabinet is shown in FIG. 2, the aircraft 100 could have multiple such cabinets.

Cabinet 134 is shown to have a communication interface (e.g., a wireless or wired interface) with switch 136, which in turn has a communication interface with a data concentrator (DC) 138. Switch 136 can be configured to route data communications between cabinet 134 and DC 138. Although switch 136 is shown as a separate component from cabinet 134, switch 136 could be a component of cabinet 134 in some implementations.

Further, DC 138 is shown to have a communication interface with the first SDU 108, the second SDU 110, a TCP 140, and a line replaceable unit (LRU) 142. DC 138 is configured to gather analog and digital communications from the first SDU 108, the second SDU 110, TCP 140, LRU 142, and/or other components of the aircraft 100 (e.g., sensors) and route the communications to cabinet 134. Similarly, DC 138 is also configured to route communications from cabinet 134 to the first SDU 108, the second SDU 110, TCP 140, LRU 142, and/or other components of the aircraft 100. Further, DC 138 can serve as a two-way gateway between communications of a first protocol and communications of a second protocol. As a particular example, data flowing between DC 138 and cabinet 134 may be of the ARINC 664 protocol, whereas data flowing between DC 138 and each of the first SDU 108, the second SDU 110, and TCP 140 may be of the ARINC 429 protocol. Other examples are possible as well. In some implementations, traditional signal wiring could be used as an alternative to DC 138.

As noted above, TCP 140 is a form that the user interface 116 of system 102 can take. Within examples, the system 102 can include multiple TCPs (e.g., one for use by a pilot, and at least one for use by another crew member).

LRU 142 includes one or more electronic components of the aircraft 100, such as a transceiver, an antenna, a display in the flight deck, and/or one or more parts of the engine, that facilitate satellite communications or other operations of the aircraft 100, but at some point in time might be replaced as part of a maintenance function. Each such component may be a separate LRU, and thus the aircraft 100 can include more such LRUs than those shown in FIG. 2. Within examples, LRU 142 can include a transceiver configured to receive and transmit communications in accordance with the ARINC 429 or ARINC 664 protocol.

Within examples of the arrangement of components shown in FIG. 2, data representing commands input to TCP 140 by the pilot or other individual, such as commands to operate in the manual mode or the automatic mode, can be routed through DC 138 and switch 136 to cabinet 134. When cabinet 134 receives the data, software or firmware that runs on cabinet 134 takes the data from a physical port of cabinet 134 and makes the data available on a virtual port so that software application 132 can use the data. Within other examples, data representing instructions to make a particular SDU the active SDU can be sent from cabinet 134 to either the first SDU 108 or the second SDU 110. Other examples are possible as well.

Figure 3:
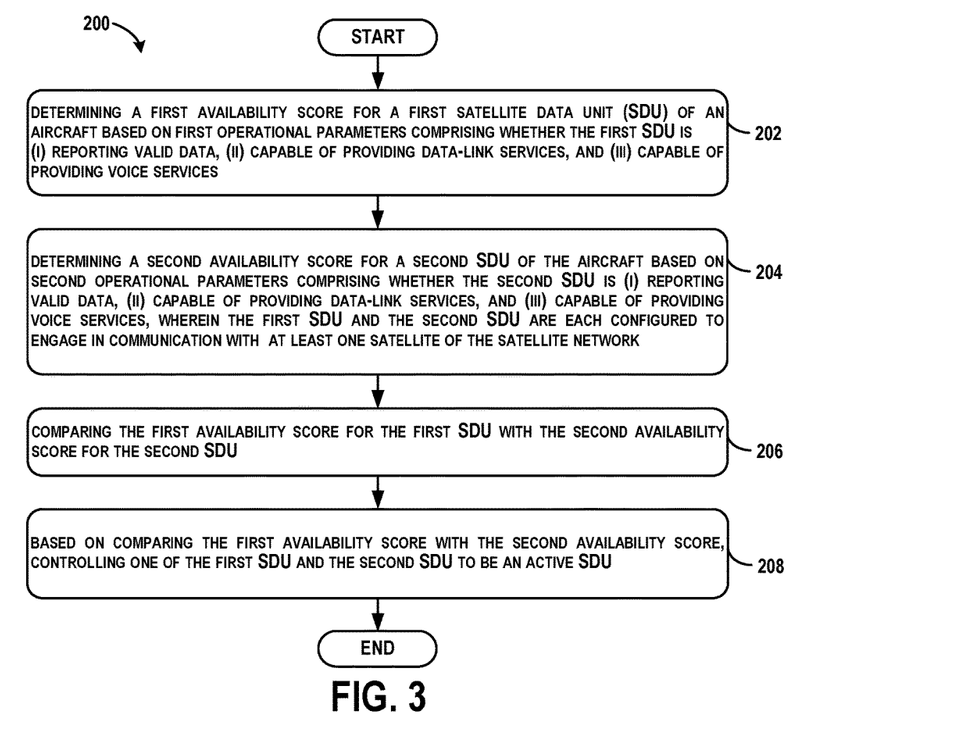
FIG. 3 shows a flowchart of an example method of communicating over a satellite network, according to an example implementation.

FIG. 3 shows a flowchart of an example method 200 of communicating over a satellite network, according to an example implementation. Method 200 shown in FIG. 3 presents an example of a method that could be used with the aircraft 100 shown in FIG. 1 or with components of the aircraft 100. Further, devices or systems, such as the system 102 or the network control computing device 106, may be used or configured to perform logical functions presented in FIG. 3. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 3, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes determining a first availability score for a first satellite data unit (SDU) of an aircraft based on first operational parameters comprising whether the first SDU is (i) reporting valid data, (ii) capable of providing data-link services, and (iii) capable of providing voice services.

At block 204, the method 200 includes determining a second availability score for a second SDU of the aircraft based on second operational parameters comprising whether the second SDU is (i) reporting valid data, (ii) capable of providing data-link services, and (iii) capable of providing voice services, where the first SDU and the second SDU are each configured to engage in communication with at least one satellite of the satellite network.

At block 206, the method 200 includes comparing the first availability score for the first SDU with the second availability score for the second SDU.

At block 208, the method 200 includes based on comparing the first availability score with the second availability score, controlling one of the first SDU and the second SDU to be an active SDU.

Figure 4:
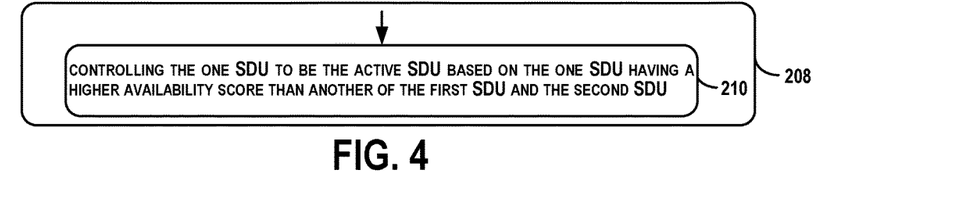
FIG. 4 shows a flowchart of an example method for performing the controlling function of the method of FIG. 3, according to an example implementation.

FIG. 4 shows a flowchart of an example method for performing the controlling as shown in block 208, according to an example implementation. At block 210, functions include controlling the one SDU to be the active SDU based on the one SDU having a higher availability score than another of the first SDU and the second SDU.

Figure 5:
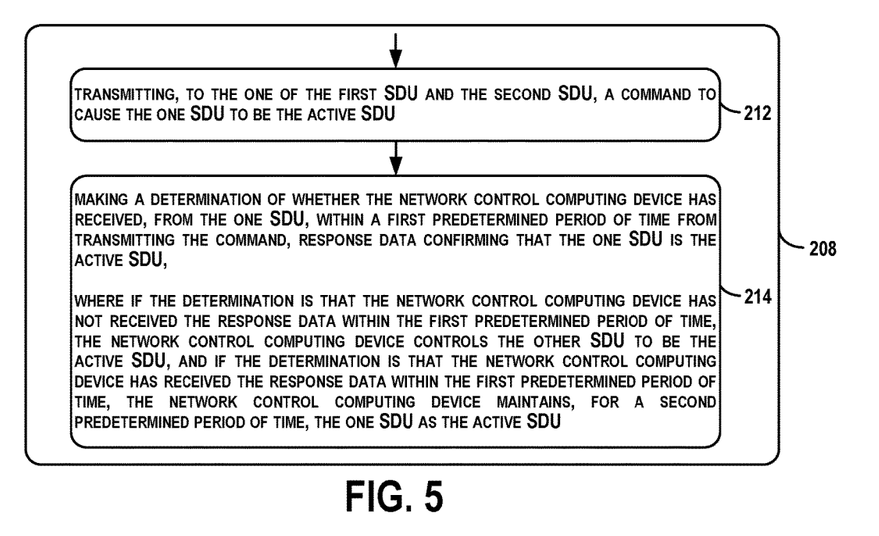
FIG. 5 shows a flowchart of another example method for performing the controlling function of the method of FIG. 3, according to an example implementation.

FIG. 5 shows a flowchart of another example method for performing the controlling as shown in block 208, according to an example implementation. At block 212, functions include transmitting, to the one of the first SDU and the second SDU, a command to cause the one SDU to be the active SDU. And at block 214, functions include making a determination of whether the network control computing device has received, from the one SDU, within a first predetermined period of time from transmitting the command, response data confirming that the one SDU is the active SDU, where if the determination is that the network control computing device has not received the response data within the first predetermined period of time, the network control computing device controls the other SDU to be the active SDU, and if the determination is that the network control computing device has received the response data within the first predetermined period of time, the network control computing device maintains, for a second predetermined period of time, the one SDU as the active SDU.

Figure 6:
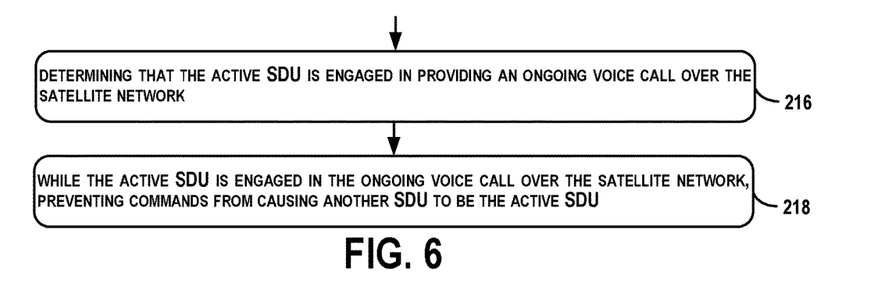
FIG. 6 shows a flowchart of an example method for use with the method of FIG. 3, according to an example implementation.

FIG. 6 shows a flowchart of an example method for use with the method 200, according to an example implementation. At block 216, functions include determining that the active SDU is engaged in providing an ongoing voice call over the satellite network. And at block 218, functions include while the active SDU is engaged in the ongoing voice call over the satellite network, preventing commands from causing another SDU to be the active SDU.

Figure 7:
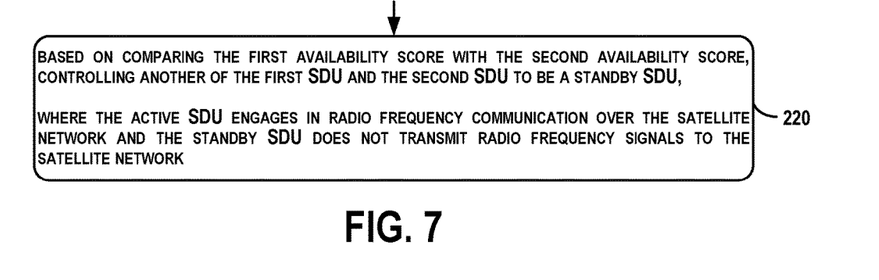
FIG. 7 shows a flowchart of another example method for use with the method of FIG. 3, according to an example implementation.

FIG. 7 shows a flowchart of another example method for use with the method 200, according to an example implementation. At block 220, functions include based on comparing the first availability score with the second availability score, controlling another of the first SDU and the second SDU to be a standby SDU, where the active SDU engages in radio frequency communication over the satellite network and the standby SDU does not transmit radio frequency signals to the satellite network.

The present disclosure describes a system for communicating over a satellite network. The system comprises a first SDU and a second SDU, each configured to engage in communication with at least one satellite of the satellite network. The system further comprises a network control computing device having a processor and memory storing instructions executable by the processor to perform a set of operations comprising determining a first availability score for the first SDU based on first operational parameters comprising whether the first SDU is (i) reporting valid data, (ii) capable of providing data-link services, and (iii) capable of providing voice services, determining a second availability score for the second SDU based on second operational parameters comprising whether the second SDU is (i) reporting valid data, (ii) capable of providing data-link services, and (iii) capable of providing voice services, comparing the first availability score for the first SDU with the second availability score for the second SDU, and based on comparing the first availability score with the second availability score, controlling one of the first SDU and the second SDU to be an active SDU.

In some implementations of the system, the set of operations further comprises based on comparing the first availability score with the second availability score, controlling another of the first SDU and the second SDU to be a standby SDU, where the active SDU engages in radio frequency communication over the satellite network and the standby SDU does not transmit radio frequency signals to the satellite network.

In some implementations of the system, the set of operations is a first set of operations, and the instructions are further executable by the processor to perform a second set of operations comprising receiving first input data representing a selection of one of two mutually-exclusive operational modes, where the two mutually-exclusive operational modes include an automatic mode and a manual mode, and in response to receiving the first input data, controlling the network control computing device to operate in accordance with the selection. In such implementations, operation in the automatic mode comprises iteratively performing the first set of operations, and operation in the manual mode comprises performing a third set of operations comprising receiving second input data representing a selection of one of the first SDU and the second SDU to be the active SDU, and in response to receiving the second input data, controlling one of the first SDU and the second SDU to be the active SDU in accordance with the selection.

In some implementations of the system, prior to determining the first availability score and the second availability score, neither the first SDU or the second SDU is the active SDU, and configuration parameters stored in the memory define the first SDU to be a preferred active SDU. In such implementations, based on the configuration parameters defining the first SDU to be the preferred active SDU prior to determining the first availability score and the second availability score: the first operational parameters used to determine the first availability score further comprise whether the first SDU is within a coverage area of the satellite network, and the second operational parameters used to determine the second availability score further comprise whether the second SDU is experiencing hardware failure.

In some implementations of the system, prior to determining the first availability score and the second availability score, the first SDU is the active SDU. In such implementations, based on the first SDU being the active SDU prior to determining the first availability score and the second availability score: the first operational parameters used to determine the first availability score further comprise whether the first SDU is within a coverage area of the satellite network, and the second operational parameters used to determine the second availability score further comprise whether the second SDU is experiencing hardware failure.

In some implementations of the system, controlling the one of the first SDU and the second SDU to be the active SDU based on comparing the first availability score with the second availability score comprises controlling the one SDU to be the active SDU based on the one SDU having a higher availability score than another of the first SDU and the second SDU.

In some implementations of the system, controlling the one of the first SDU and the second SDU to be the active SDU comprises transmitting, to the one of the first SDU and the second SDU, a command to cause the one SDU to be the active SDU, and making a determination of whether the network control computing device has received, from the one SDU, within a first predetermined period of time from transmitting the command, response data confirming that the one SDU is the active SDU, where if the determination is that the network control computing device has not received the response data within the first predetermined period of time, the network control computing device controls the other SDU to be the active SDU, and if the determination is that the network control computing device has received the response data within the first predetermined period of time, the network control computing device maintains, for a second predetermined period of time, the one SDU as the active SDU. In such implementations, the first predetermined period of time has a value in a range between 15 and 90 seconds, and the second predetermined period of time has a value in a range between 10 and 20 minutes.

In some implementations of the system, the set of operations further comprises determining that the active SDU is engaged in providing an ongoing voice call over the satellite network, and while the active SDU is engaged in the ongoing voice call over the satellite network, preventing commands from causing another SDU to be the active SDU.

The present disclosure further describes an aircraft comprising a first SDU and a second SDU, each configured to engage in communication with at least one satellite of the satellite network. The aircraft further comprises a network control computing device having a processor and memory storing instructions executable by the processor to perform a set of operations comprising determining a first availability score for the first SDU based on first operational parameters comprising whether the first SDU is (i) reporting valid data, (ii) capable of providing data-link services, and (iii) capable of providing voice services, determining a second availability score for the second SDU based on second operational parameters comprising whether the second SDU is (i) reporting valid data, (ii) capable of providing data-link services, and (iii) capable of providing voice services, comparing the first availability score for the first SDU with the second availability score for the second SDU, and based on comparing the first availability score with the second availability score, controlling one of the first SDU and the second SDU to be an active SDU.

In some implementations of the aircraft, the set of operations further comprises based on comparing the first availability score with the second availability score, controlling another of the first SDU and the second SDU to be a standby SDU, wherein the active SDU engages in radio frequency communication over the satellite network and the standby SDU does not transmit radio frequency signals to the satellite network.

In some implementations of the aircraft, the set of operations is a first set of operations, and the instructions are further executable by the processor to perform a second set of operations comprising receiving first input data representing a selection of one of two mutually-exclusive operational modes, where the two mutually-exclusive operational modes include an automatic mode and a manual mode, and in response to receiving the first input data, controlling the network control computing device to operate in accordance with the selection. In such implementations, operation in the automatic mode comprises iteratively performing the first set of operations, and operation in the manual mode comprises performing a third set of operations comprising receiving second input data representing a selection of one of the first SDU and the second SDU to be the active SDU, and in response to receiving the second input data, controlling one of the first SDU and the second SDU to be the active SDU in accordance with the selection.

In some implementations of the aircraft, prior to determining the first availability score and the second availability score, neither the first SDU or the second SDU is the active SDU, and configuration parameters stored in the memory define the first SDU to be a preferred active SDU. In such implementations, based on the configuration parameters defining the first SDU to be the preferred active SDU prior to determining the first availability score and the second availability score: the first operational parameters used to determine the first availability score further comprise whether the first SDU is within a coverage area of the satellite network, and the second operational parameters used to determine the second availability score further comprise whether the second SDU is experiencing hardware failure.

In some implementations of the aircraft, prior to determining the first availability score and the second availability score, the first SDU is the active SDU. In such implementations, based on the first SDU being the active SDU prior to determining the first availability score and the second availability score: the first operational parameters used to determine the first availability score further comprise whether the first SDU is within a coverage area of the satellite network, and the second operational parameters used to determine the second availability score further comprise whether the second SDU is experiencing hardware failure.

In some implementations of the aircraft, controlling the one of the first SDU and the second SDU to be the active SDU based on comparing the first availability score with the second availability score comprises controlling the one SDU to be the active SDU based on the one SDU having a higher availability score than another of the first SDU and the second SDU.

In some implementations of the aircraft, controlling the one of the first SDU and the second SDU to be the active SDU comprises transmitting, to the one of the first SDU and the second SDU, a command to cause the one SDU to be the active SDU, and making a determination of whether the network control computing device has received, from the one SDU, within a first predetermined period of time from transmitting the command, response data confirming that the one SDU is the active SDU, where if the determination is that the network control computing device has not received the response data within the first predetermined period of time, the network control computing device controls the other SDU to be the active SDU, and if the determination is that the network control computing device has received the response data within the first predetermined period of time, the network control computing device maintains, for a second predetermined period of time, the one SDU as the active SDU. In such implementations, the first predetermined period of time has a value in a range between 15 and 90 seconds, and the second predetermined period of time has a value in a range between 10 and 20 minutes.

The present disclosure further describes a method for communicating over a satellite network. The method comprises determining a first availability score for a first satellite data unit (SDU) of an aircraft based on first operational parameters comprising whether the first SDU is (i) reporting valid data, (ii) capable of providing data-link services, and (iii) capable of providing voice services, determining a second availability score for a second SDU of the aircraft based on second operational parameters comprising whether the second SDU is (i) reporting valid data, (ii) capable of providing data-link services, and (iii) capable of providing voice services, where the first SDU and the second SDU are each configured to engage in communication with at least one satellite of the satellite network, comparing the first availability score for the first SDU with the second availability score for the second SDU, and based on comparing the first availability score with the second availability score, controlling one of the first SDU and the second SDU to be an active SDU.

In some implementations of the method, the method further comprises based on comparing the first availability score with the second availability score, controlling another of the first SDU and the second SDU to be a standby SDU, where the active SDU engages in radio frequency communication over the satellite network and the standby SDU does not transmit radio frequency signals to the satellite network.

In some implementations of the method, controlling the one of the first SDU and the second SDU to be the active SDU based on comparing the first availability score with the second availability score comprises controlling the one SDU to be the active SDU based on the one SDU having a higher availability score than another of the first SDU and the second SDU By the term "substantially" and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system for communicating over a satellite network, the system comprising:
   a first satellite data unit (SDU) and a second SDU, each configured to engage in communication with at least one satellite of the satellite network; and
   a network control computing device having a processor and memory storing instructions executable by the processor to perform a set of operations comprising:
      determining a first availability score for the first SDU based on first operational parameters comprising one or more of: whether the first SDU is reporting valid data, whether the first SDU is capable of providing data-link services, or whether the first SDU is capable of providing voice services;
      determining a second availability score for the second SDU based on second operational parameters comprising one or more of: whether the second SDU is reporting valid data, whether the second SDU is capable of providing data-link services, or whether the second SDU is capable of providing voice services;
      comparing the first availability score for the first SDU with the second availability score for the second SDU; and
      based on comparing the first availability score with the second availability score, controlling one of the first SDU and the second SDU to be an active SDU.

2. The system of claim 1, wherein the set of operations further comprises:
   based on comparing the first availability score with the second availability score, controlling another of the first SDU and the second SDU to be a standby SDU, wherein the active SDU engages in radio frequency communication over the satellite network and the standby SDU does not transmit radio frequency signals to the satellite network.

3. The system of claim 1, wherein the set of operations is a first set of operations, and
   wherein the instructions are further executable by the processor to perform a second set of operations comprising:
   receiving first input data representing a selection of one of two mutually-exclusive operational modes, wherein the two mutually-exclusive operational modes include an automatic mode and a manual mode; and
   in response to receiving the first input data, controlling the network control computing device to operate in accordance with the selection,
   wherein operation in the automatic mode comprises iteratively performing the first set of operations, and
   wherein operation in the manual mode comprises performing a third set of operations comprising:
      receiving second input data representing a selection of one of the first SDU and the second SDU to be the active SDU; and
      in response to receiving the second input data, controlling one of the first SDU and the second SDU to be the active SDU in accordance with the selection.

4. The system of claim 1, wherein the first operational parameters used to determine the first availability score further comprise whether the first SDU is within a coverage area of the satellite network, and
   wherein the second operational parameters used to determine the second availability score further comprise whether the second SDU is experiencing hardware failure.

5. The system of claim 4, wherein configuration parameters stored in the memory define a predetermined timer value for determining whether the first SDU is within the coverage area of the satellite network, and
   wherein determining whether the first SDU is within the coverage area of the satellite network comprises determining whether the first SDU has not been within the coverage area of the satellite network for at least the predetermined timer value.

6. The system of claim 1, wherein controlling the one of the first SDU and the second SDU to be the active SDU based on comparing the first availability score with the second availability score comprises controlling the one SDU to be the active SDU based on the one SDU having a higher availability score than another of the first SDU and the second SDU.

7. The system of claim 1, wherein controlling the one of the first SDU and the second SDU to be the active SDU comprises:
 transmitting, to the one of the first SDU and the second SDU, a command to cause the one SDU to be the active SDU; and
 making a determination of whether the network control computing device has received, from the one SDU, within a first predetermined period of time from transmitting the command, response data confirming that the one SDU is the active SDU,
 wherein if the determination is that the network control computing device has not received the response data within the first predetermined period of time, the network control computing device controls the other SDU to be the active SDU, and if the determination is that the network control computing device has received the response data within the first predetermined period of time, the network control computing device maintains, for a second predetermined period of time, the one SDU as the active SDU.

8. The system of claim 7, wherein the first predetermined period of time has a value in a range between 15 and 90 seconds, and
 wherein the second predetermined period of time has a value in a range between 10 and 20 minutes.

9. The system of claim 1, wherein the set of operations further comprises:
 determining that the active SDU is engaged in providing an ongoing voice call over the satellite network; and
 while the active SDU is engaged in the ongoing voice call over the satellite network, preventing commands from causing another SDU to be the active SDU.

10. An aircraft comprising:
 a first satellite data unit (SDU) and a second SDU, each configured to engage in communication with at least one satellite of a satellite network; and
 a network control computing device having a processor and memory storing instructions executable by the processor to perform a set of operations comprising:
  determining a first availability score for the first SDU based on first operational parameters comprising one or more of: whether the first SDU is reporting valid data, whether the first SDU is capable of providing data-link services, or whether the first SDU is capable of providing voice services;
  determining a second availability score for the second SDU based on second operational parameters comprising one or more of: whether the second SDU is reporting valid data, whether the second SDU is capable of providing data-link services, or whether the second SDU is capable of providing voice services;
  comparing the first availability score for the first SDU with the second availability score for the second SDU; and
  based on comparing the first availability score with the second availability score, controlling one of the first SDU and the second SDU to be an active SDU.

11. The aircraft of claim 10, wherein the set of operations further comprises:

based on comparing the first availability score with the second availability score, controlling another of the first SDU and the second SDU to be a standby SDU, wherein the active SDU engages in radio frequency communication over the satellite network and the standby SDU does not transmit radio frequency signals to the satellite network.

12. The aircraft of claim 10, wherein the set of operations is a first set of operations, and
 wherein the instructions are further executable by the processor to perform a second set of operations comprising:
  receiving first input data representing a selection of one of two mutually-exclusive operational modes, wherein the two mutually-exclusive operational modes include an automatic mode and a manual mode; and
  in response to receiving the first input data, controlling the network control computing device to operate in accordance with the selection,
  wherein operation in the automatic mode comprises iteratively performing the first set of operations, and
  wherein operation in the manual mode comprises performing a third set of operations comprising:
   receiving second input data representing a selection of one of the first SDU and the second SDU to be the active SDU; and
   in response to receiving the second input data, controlling one of the first SDU and the second SDU to be the active SDU in accordance with the selection.

13. The aircraft of claim 10, wherein the first operational parameters used to determine the first availability score further comprise whether the first SDU is within a coverage area of the satellite network, and
 wherein the second operational parameters used to determine the second availability score further comprise whether the second SDU is experiencing hardware failure.

14. The aircraft of claim 13, wherein configuration parameters stored in the memory define a predetermined timer value for determining whether the first SDU is within the coverage area of the satellite network, and
 wherein determining whether the first SDU is within the coverage area of the satellite network comprises determining whether the first SDU has not been within the coverage area of the satellite network for at least the predetermined timer value.

15. The aircraft of claim 10, wherein controlling the one of the first SDU and the second SDU to be the active SDU based on comparing the first availability score with the second availability score comprises controlling the one SDU to be the active SDU based on the one SDU having a higher availability score than another of the first SDU and the second SDU.

16. The aircraft of claim 10, wherein controlling the one of the first SDU and the second SDU to be the active SDU comprises:
 transmitting, to the one of the first SDU and the second SDU, a command to cause the one SDU to be the active SDU; and
 making a determination of whether the network control computing device has received, from the one SDU, within a first predetermined period of time from transmitting the command, response data confirming that the one SDU is the active SDU,
 wherein if the determination is that the network control computing device has not received the response data within the first predetermined period of time, the network control computing device controls the other SDU to be the active SDU, and if the determination is that the network control computing device has received the response data within the first predetermined period of time, the network control computing device maintains, for a second predetermined period of time, the one SDU as the active SDU.

17. The aircraft of claim 16, wherein the set of operations further comprises:
   determining that the active SDU is engaged in providing an ongoing voice call over the satellite network; and
   while the active SDU is engaged in the ongoing voice call over the satellite network, preventing commands from causing another SDU to be the active SDU.

18. A method for communicating over a satellite network, the method comprising:
   determining a first availability score for a first satellite data unit (SDU) of an aircraft based on first operational parameters comprising one or more of: whether the first SDU is reporting valid data, whether the first SDU is capable of providing data-link services, or whether the first SDU is capable of providing voice services;
   determining a second availability score for a second SDU of the aircraft based on second operational parameters comprising one or more of: whether the second SDU is reporting valid data, whether the second SDU is capable of providing data-link services, or whether the second SDU is capable of providing voice services, wherein the first SDU and the second SDU are each configured to engage in communication with at least one satellite of the satellite network;
   comparing the first availability score for the first SDU with the second availability score for the second SDU; and
   based on comparing the first availability score with the second availability score, controlling one of the first SDU and the second SDU to be an active SDU.

19. The method of claim 18, further comprising:
   based on comparing the first availability score with the second availability score, controlling another of the first SDU and the second SDU to be a standby SDU, wherein the active SDU engages in radio frequency communication over the satellite network and the standby SDU does not transmit radio frequency signals to the satellite network.

20. The method of claim 18, wherein controlling the one of the first SDU and the second SDU to be the active SDU based on comparing the first availability score with the second availability score comprises controlling the one SDU to be the active SDU based on the one SDU having a higher availability score than another of the first SDU and the second SDU.

* * * * *